United States Patent Office 3,006,776
Patented Oct. 31, 1961

3,006,776
OPTICAL GLASS
Walter Geffcken, Mainz, Germany, assignor to Jenaer Glaswerk Schott & Gen, Mainz, Germany
No Drawing. Filed July 12, 1954, Ser. No. 442,886
Claims priority, application Germany July 17, 1953
4 Claims. (Cl. 106—54)

The subject matter of my copending application Ser. No. 352,992 filed May 4, 1953 and now Patent Ser. No. 2,861,000 is relative to optical glasses which with reference to the $n_d$-value possess especially high values in Abbé-number $v$. These glasses substantially consist of boronoxide ($B_2O_3$), lanthanum oxide ($La_2O_3$), zirconium oxide ($ZrO_2$) and calcium oxide (CaO). These glasses, as shown in my copending application, may also contain additions as well known in the melting of glasses, e.g. of aluminum oxide, silica ($SiO_2$), indium oxide, germanium oxide, tungsten oxide, etc. up to totally 4%. The optical glass disclosed in application Ser. No. 352,992 is a thorium oxide and beryllium oxide free glass consisting essentially of:

(a) 36–50 weight percent boronoxide,
(b) 26–44 weight percent lanthanum oxide,
(c) 5–19 weight percent calcium oxide,
(d) 0–11 weight percent zirconium oxide,
(e) 0–6 weight percent of a bivalent basic component other than calcium oxide,
(f) 0–9 weight percent of a member selected from the group consisting of niobium oxide, tantalum oxide and mixtures thereof,
(g) 0–2 weight percent lithium oxide,
(h) 0–4 weight percent of compatible glass constituents, the amounts of (c), (e) and (g) not exceeding a total of 19 weight percent, the sum of (c), (e) and 2(g) not exceeding the value of 33 weight percent minus one half (b).

In the instant invention, the improvement for increasing the resistance to surface weathering consists in replacing a portion of the alkaline earth oxide content by 4–12 percent zinc oxide and additionally the glass mass may be provided with a silica content of between 0–10 weight percent. In all other respects the glass is produced in the identical manner disclosed in application Serial No. 352,992.

Some of these glasses are of comparatively little resistance to surface weathering. This defect has been considerably reduced but not completely eliminated in accordance with the subject matter of my copending application Ser. No. 372,155, filed August 3, 1953 and now Patent Serial No. 2,745,757 where up to 10% of boronoxide is substituted by the same percent of weight of silica ($SiO_2$), but the remaining content being not lower than 36%.

However, in accordance with invention it is possible to melt glasses with great resistance to surface weathering if at the same time the content of alkaline earth oxide is partly replaced by zinc oxide. Thereby the content of zinc oxide may not be less 4% but may, if the desired $v$-value permits, be increased to 12%.

In order to obtain as high a $v$-value as possible with as little lanthanum oxide as possible it is feasible to keep the content of zinc oxide between 5% and 7%.

The most favorable content of silica is between 8% and 10% because only at this percentage is the influence of zinc oxide, which increases durability, brought into full play without the optical position being perceptively displaced toward smaller $v$-values.

The most favorable glasses in accordance with the invention are obtained at approx. the following combination in weight percent:

$B_2O_3$ _____ 36.0   CaO _____ 10.0
$ZrO_2$ _____ 4.0    $SiO_2$ _____ 10.0
$La_2O_3$ _____ 34.0   ZnO _____ 6.0

I claim:
1. Optical glass with a high refractive index having the following composition in weight percent:

$B_2O_3$ _____ 36.0   CaO _____ 10.0
$ZrO_2$ _____ 4.0    $SiO_2$ _____ 10.0
$La_2O_3$ _____ 34.0   ZnO _____ 6.0

2. In a thorium oxide and beryllium oxide free optical glass with a high refractive index consisting of:

(a) 36–50 weight percent boron oxide;
(b) 26–44 weight percent lanthanum oxide;
(c) 5–19 weight percent calcium oxide;
(d) 0–11 weight percent zirconium oxide;
(e) 0–6 weight percent of a bivalent basic component other than calcium oxide;
(f) 0–9 weight percent of a member selected from the group consisting of niobium oxide, tantalum oxide, and mixtures thereof;
(g) 0–2 weight percent lithium oxide;
(h) 0–4 weight percent of compatible glass constituents;

the amounts of (c), (e), and (g) not exceeding a total of 19 weight percent, the sum of (c), (e), and 2(g) not exceeding the value of 33 weight percent minus one-half (b), the improvement for increasing the resistance to surface weathering which comprises a portion of the alkaline earth oxide content being replaced by 4–12 percent zinc oxide and a silica content of between 0–10 weight percent.

3. Optical glass according to claim 2 in which said zinc oxide is present in amount between about 5 and 8 weight percent.

4. Optical glass according to claim 2 in which said silica is present in amount between about 8 and 10 weight percent.

References Cited in the file of this patent
UNITED STATES PATENTS 2,584,975   Armistead _____ Feb. 12, 1952
2,678,281   Geffcken et al. _____ May 11, 1954